(12) United States Patent
Kraft (10) Patent No.: US 7,328,031 B2
(45) Date of Patent: Feb. 5, 2008

(54) MESSAGE EXCHANGE HANDLING CONCEPT

(75) Inventor: Christian R. Kraft, Copenhagen (DK)

(73) Assignee: Nokia Corporation, Espoo (FI)

( * ) Notice: Subject to any disclaimer, the term of this patent is extended or adjusted under 35 U.S.C. 154(b) by 107 days.

(21) Appl. No.: 11/018,333

(22) Filed: Dec. 21, 2004

(65) Prior Publication Data

US 2005/0101338 A1    May 12, 2005

Related U.S. Application Data

(63) Continuation of application No. 09/735,061, filed on Dec. 12, 2000, now Pat. No. 6,915,138.

(30) Foreign Application Priority Data

Dec. 14, 1999 (GB) .................... 9929574.3

(51) Int. Cl.
*H04Q 7/22* (2006.01)
*H04Q 7/20* (2006.01)
*H04M 1/00* (2006.01)
*G06F 15/16* (2006.01)
*G06F 3/00* (2006.01)

(52) U.S. Cl. ............... 455/466; 455/412.1; 455/412.2; 455/550.1; 455/556.2; 709/203; 709/219; 715/758

(58) Field of Classification Search .. 455/414.1–414.4, 455/412.1–412.2, 418–420, 445, 454, 517–521, 455/560–561, 466, 59, 403, 70, 72, 566, 455/550.1, 556.2, 416, 422.1, 424–425, 557–558, 455/259–267; 709/203–206, 219, 201–207; 370/312–313, 349–350, 389–392, 432–434, 370/473–474; 715/758–760
See application file for complete search history.

(56) References Cited

U.S. PATENT DOCUMENTS

| | | | |
|---|---|---|---|
| 4,951,044 A | 8/1990 | Nelson et al. | 340/825.44 |
| 5,719,918 A | 2/1998 | Serbetciouglu et al. | 379/58 |
| 5,959,543 A | 9/1999 | LaPorta et al. | 340/825.44 |
| 5,977,880 A | 11/1999 | Aoki | 340/825.44 |
| 6,044,265 A * | 3/2000 | Roach, Jr. | 455/419 |
| 6,044,275 A * | 3/2000 | Boltz et al. | 455/466 |
| 6,085,100 A * | 7/2000 | Tarnanen | 455/466 |

(Continued)

FOREIGN PATENT DOCUMENTS

EP    0825790 A2    2/1998

(Continued)

*Primary Examiner*—Meless Zewdu
(74) *Attorney, Agent, or Firm*—Harrington & Smith, PC (57) ABSTRACT

A message exchange session between wireless communication terminals via a wireless network is initiated from one of the terminals. The user of the initiating terminal invites at least one other communication terminal to participate in the message exchange session. This is done by forwarding a message text to said at least one other communication terminal. The user of the other terminal responds to received message by inputting a message text for replying to the received message. Then the responding terminal automatically adds the inputted reply message text to the received message text, whereby the aggregate message text includes the message exchange session history, and the aggregate message text is then transmitted to the other communication terminals being party to the message exchange session.

53 Claims, 8 Drawing Sheets

U.S. PATENT DOCUMENTS

| | | | | |
|---|---|---|---|---|
| 6,151,507 A * | 11/2000 | Laiho et al. | | 455/466 |
| 6,282,565 B1 * | 8/2001 | Shaw et al. | | 709/206 |
| 6,286,064 B1 | 9/2001 | King et al. | | 710/67 |
| 6,292,669 B1 * | 9/2001 | Meuronen et al. | | 455/466 |
| 6,301,609 B1 * | 10/2001 | Aravamudan et al. | | 709/207 |
| 6,385,461 B1 | 5/2002 | Raith | | 455/518 |
| 6,424,841 B1 | 7/2002 | Gustafsson | | 455/466 |
| 6,484,196 B1 * | 11/2002 | Maurille | | 709/206 |
| 6,496,853 B1 | 12/2002 | Klein | | 709/206 |
| 6,510,153 B1 * | 1/2003 | Inoue et al. | | 370/354 |
| 6,535,746 B1 * | 3/2003 | Yu et al. | | 455/466 |
| 6,580,917 B1 | 6/2003 | Lefevre et al. | | 455/466 |
| 6,915,138 B2 * | 7/2005 | Kraft | | 455/466 |

FOREIGN PATENT DOCUMENTS

| | | |
|---|---|---|
| EP | 0929201 A2 | 7/1999 |
| GB | 2317073 A | 11/1998 |
| WO | WO 99/63729 | 9/1999 |

* cited by examiner

MESSAGE EXCHANGE HANDLING CONCEPT

CROSS-REFERENCE TO RELATED APPLICATIONS

This application is a continuation of and claims priority to U.S. patent application Ser. No. 09/735,061, filed on Dec. 12, 2000 now U.S. Pat. No. 6,915,138.

BACKGROUND OF THE INVENTION

The invention relates to handling of messages between wireless communication terminals in a communication network.

Communication terminals for use in cellular communication networks are basically designed for voice communication. In the GSM system text messages may be sent via a point-to point short message service provided by the network. New phones having improved text editors have made it more popular to use short message services and recently it has been observed by some operators that the use of short message services correponds to 10 percent of the network traffic. Many operators see a significantly lower message percentage of the network traffic. However there is an indication saying that the message based traffic will rise in the coming years. Now it is possible to send a message from one terminal to another and to send a reply the opposite way.

Therefore there will be a need for providing an improved message exchange handling concept.

SUMMARY OF THE INVENTION

According to a first aspect of the invention there is provided a method for handling a message exchange session between wireless communication terminals via a wireless network, and including steps of initiating a message exchange session by identifying in a first communication terminal at least one other communication terminal be invited to participate in the message exchange session, inputting a message text, and transmitting said message text to said at least one other communication terminal. The received message is responded by inputting a message text for replying to the received message, adding said inputted reply message text to the received message text, whereby the aggregate message text includes the message exchange session history, and transmitting said aggregate message text to the other communication terminal being parties in the message exchange session.

Hereby it is possible to transmit the message history, or at least the newest part of it, between the terminals during the session. The users will have a possibility to just scroll a few lines to see the background for a recently received message. This is an extremely important feature as long as the major part of the mobile phones only shows 3-5 lines in the display. Advantageously the originator of each input in the history is identified with a chat name or the like.

The first aspect of the invention is also related to a wireless communication terminal having a message exchange session handling application for handling messages in a message exchange session in a wireless communication system. This terminal comprises a software application having means for initiating a message exchange session, said initiating means includes means for identifying at least one other communication terminal to be invited to participate in the message exchange session and means for entering a text input as a message text. Furthermore the terminal comprises a transmitter for transmitting said message text to said at least one other communication terminal, and a receiver for receiving a reply from said at least one other communication terminal. The software application furthermore having means for replying to a message during a message exchange session, and the replying means includes means for entering a text input, and means for adding said text input to the received message text for generating an aggregate text message being replied by means of the transmitter.

A computer program product stored on a computer readable storage medium, comprises according to the first aspect of the invention computer readable program code means for replying to a message during a message exchange session in a wireless communication system, said computer readable program code means provides a message exchange session handling application in a wireless communication terminal, and said computer readable program code means handles a text input entered by the user, and adds said text input to the received message text for generating an aggregate message text for replying. Such a computer program product may be flashed into the terminal at a service office or via the data port of the terminal e.g. via a Personal Computer e.g. having Internet access.

According to a second aspect of the invention there is provided a method for handling a message exchange session between wireless communication terminals via a wireless network, and including steps of sending from a wireless communication terminal by means of a point-to point short message service in the wireless network a message containing a request for participating in a message exchange session, routing the request message from the wireless communication terminal to a message exchange session handling server via the wireless network, connecting in the message exchange session handling server the requesting wireless communication terminal to a group of communication terminals, handling a message text in said message exchange session handling server by succesively adding received message text from group of communication terminals to the message text in order to update the message text, and transmitting the updated message text to the group of communication terminals participating in the message exchange session.

Hereby it is possible for an operator to set up a message exchange session between several phones. The participants do not know each other and the chat session will be anonymous.

The second aspect of the invention is also related to a system for handling a message exchange session between wireless communication terminals via a wireless network. The system includes means for handling a point-to point short message service in the wireless network, a message exchange session handling server, and a group of wireless communication terminals accessing said message exchange session handling server via said point-to point short message service. The wireless communication terminals are adapted to send a request for participating in a message exchange session by means of point-to point short message service to said message exchange session handling server. The message exchange session handling server has a message text for the group of wireless communication terminals, and the server updates the message text by succesively adding received message text from members of the group of communication terminals, and transmits the updated message text to the group of communication terminals participating in the message exchange session.

According to a third aspect of the invention there is provided a method for handling a message exchange session between wireless communication terminals including steps of generating a list of communication terminals invited to participate in the message exchange session, inputting a message text, transmitting said message text to the communication terminals listed on said list, receiving a reply from one of the communication terminals listed on said list, and transmitting the reply from said one of the communication terminals to the communication terminals listed on said list.

Hereby it is possible for a phone user to set up a message exchange session between several terminals where his terminal acts as server for the session. This kind of session may be regarded as a conference chat. The initiating user controls the participants of the session and he is able to set up a distribution list for this purpose.

The third aspect of the invention is also related to a wireless communication terminal having a message exchange session handling application for handling messages in a message exchange session in a wireless communication system, said terminal comprises means for generating a list of communication terminals invited to participate in the message exchange session, means for inputting a message text, means for transmitting said message text to the communication terminals listed on said list, means for receiving a reply from one of the communication terminals listed on said list, and means for transmitting the reply from said one of the communication terminals to the communication terminals listed on said list.

BRIEF DESCRIPTION OF THE DRAWINGS

For a better understanding of the present invention and to understand how the same may be brought into effect reference will now be made by way of example only to the accompanying drawings in which.

Figure 1:
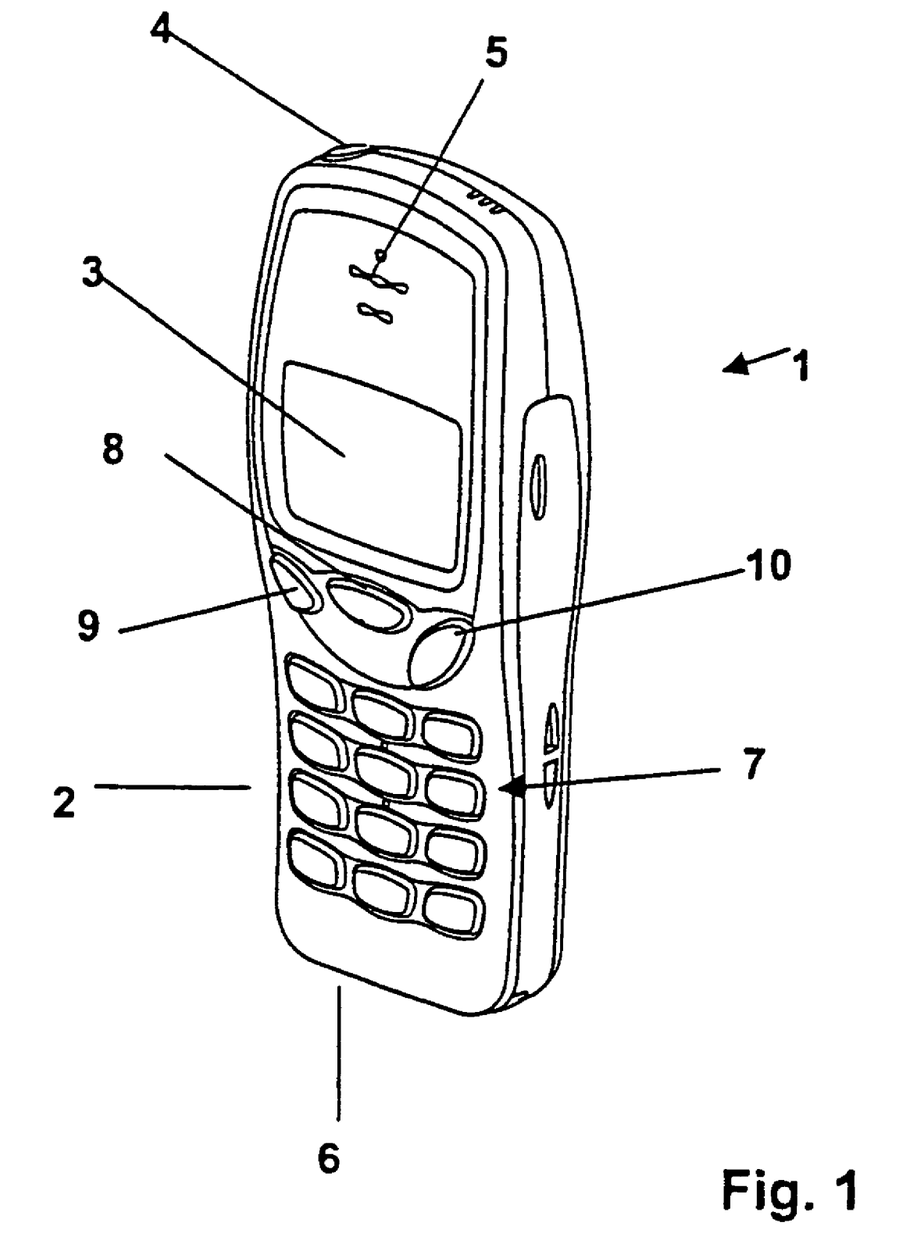
FIG. 1 illustrates a preferred embodiment of a hand portable phone according to the invention.

FIG. 1 shows a preferred embodiment of a phone according to the invention, and it will be seen that the phone, which is generally designated by 1, comprises a user interface having a keypad 2, a display 3, an on/off button 4, a speaker 5 (only openings are visable in the present view), and a microphone 6 (openings in bottom not visible in the present view). The phone 1 according to the preferred embodiment is adapted for communication via a cellular network.

According to the first embodiment shown in FIG. 1, the keypad 2 has a first group 7 of keys including twelve alphanumeric keys. In addition to this the keypad 2 has one soft keys 8, a scroll key 10 for navigating the cursor in the display 3, a "clear key" 9 for clearing one or more letters from the display. The calls are handled by means of the soft keys 8, the scroll key 10 and the "clear key" 9. The present functionality of the soft key 8 is shown in a field in the display 3 just above the soft key 8. A phone having a single soft key is described in two pending U.S. patent applications Ser. Nos. 08/975,126 and 08/975,232 filed by the applicant.

Figure 2:
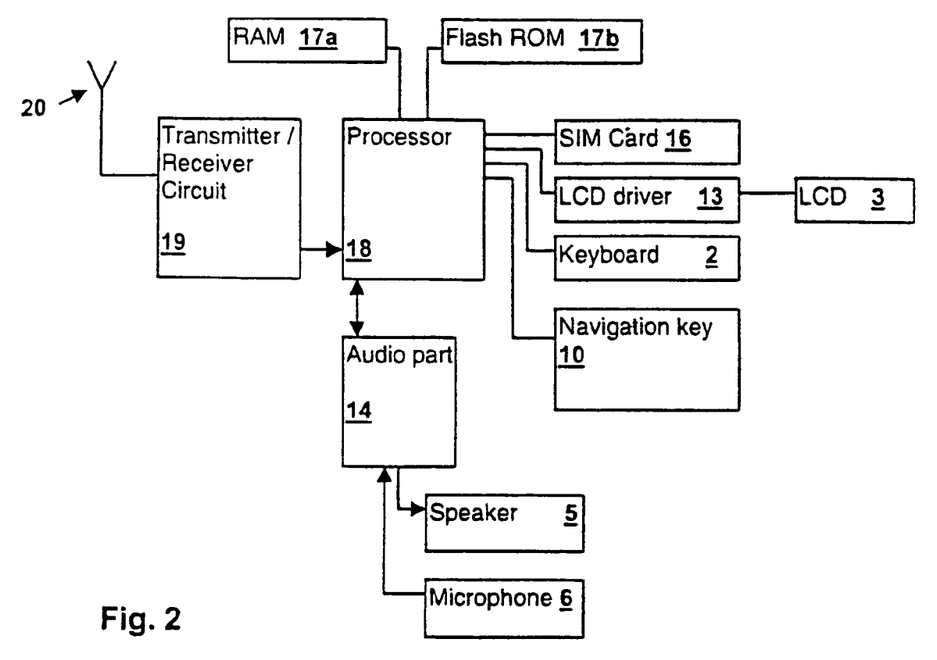
FIG. 2 schematically shows the essential parts of a telephone for communication with a cellular network.

FIG. 2 schematically shows the most important parts of a preferred embodiment of the phone, said parts being essential to the understanding of the invention. The preferred embodiment of the phone of the invention is adapted for use in connection with the GSM 900 MHz and GSM 1800 MHz network, but, of course, the invention may also be applied in connection with other cellular phone networks or cordless networks. A processor 18 controls the communication with the network via a transmitter/receiver circuit 19 and an antenna 20.

The microphone 6 transforms the user's speech into analog signals, and the analog signals formed thereby are A/D converted in an A/D converter (not shown) before the speech encoding in an audio part 14. The encoded speech signal is transferred to the processor 18, which i.a. supports the GSM terminal software. The audio part 14 decodes the audio signal, which is transferred to the earpiece 5 via a D/A converter (not shown).

The processor 18 also forms the interface to the peripheral units of the apparatus, including a RAM memory 17a and a Flash ROM memory 17b, a SIM card 16, the display 3 and the keypad 2.

Message handling according to the preferred embodiment of the invention is based on using a standard wireless messaging concept, e.g. the Short Messaging Service (SMS) well known from the GSM specification. The user sends an SMS message whenever he wants to contribute to the chatting, and he will receive a short message whenever another user has typed a new text. The chatting does not necessarily have to be based on the use of SMS messages but could also include E-mail being converted to SMS messages at the chat server and forwarded to the chat participants as an ordinary chat message. Hereby the chat participants may be identified by phone number or E-mail address or the like. Furthermore messages for communication specifications other than GSM could be used.

FIRST EMBODIMENT—POINT OF POINT CHAT

Figure 3:
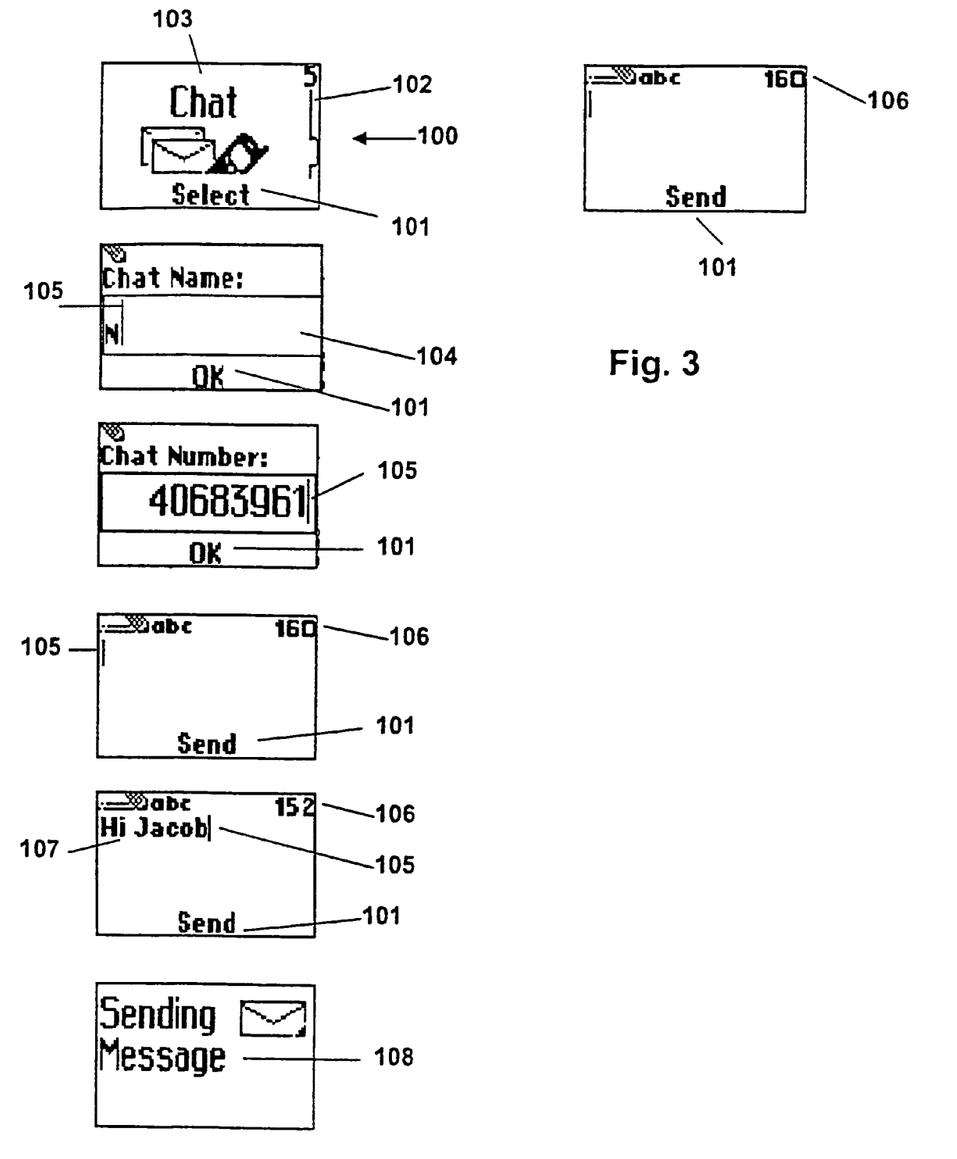
FIG. 3 shows a display sequence illustrating the initiation of a chat session according to the preferred embodiment of the invention.

According to the preferred embodiment the user is able to chat with another user, basically by allowing an easy swapping between message writing and message viewing. The user has to set up e.g. a phone number identifying one other specific other user for point to point chatting. With reference to FIG. 3, a chat display sequence is shown for a Nokia phone having a single soft key 8 as shown in FIG. 1 will be shown.

The first display 100 in FIG. 3 is a chat entry display in the main menu (or inside the messages menu) of the phone, and in the preferred embodiment it includes a text label 101 defining the present functionality "select" of the soft key 8, a menu status bar 102 informing the user about the present position (menu level 5) in the menu structure and an animating icon 103 presenting the application for the user in a way so he can recognize it.

Selecting "chat" allows the user to define what number to chat with (point-to-point chatting) for an arbitrary exchange of messages between the user and the defined numbers. In the second display 104 the user is invited to enter a very short chat name —preferably only one or two characters —in a text box 104 and a marking bar 105 indicates the position of the next entered character. When the user has entered the chat name he presses the soft key 8 having the present functionality "OK" as shown by the text label 101.

Empty names could also be accepted as chat names, and preferably the name used last time is displayed as default, whereby the user only has to accept the name if he will not make amendments. When the user accepts the chat name he is (in the third display) asked for the number—either a single user or a server—for the chatting.

When user has entered a chat number or fetched a chat number from the phonebook memory of the phone, he will immediately enter the "normal" SMS editor for a GSM phone, as shown in the fourth display. Here the marking bar 105 indicates the position of the character to be entered, and digit 106 the maximum number of characters that can still be entered into the message.

By selecting "Send" the phone will immediately send the written text 107 to the number specified for chatting and this will be indicated by an animation 108 shown in the sixth display. If the user presses the scroll key 10 he will get access to the alternative options available in the soft key 8. These options may include e.g. "T9 options", "Save" and "Insert template". The phone will now re-enter the text editor as shown in the seventh display of FIG. 3. The other user receives the chat message as a normal message (normal SMS).

Figure 4:
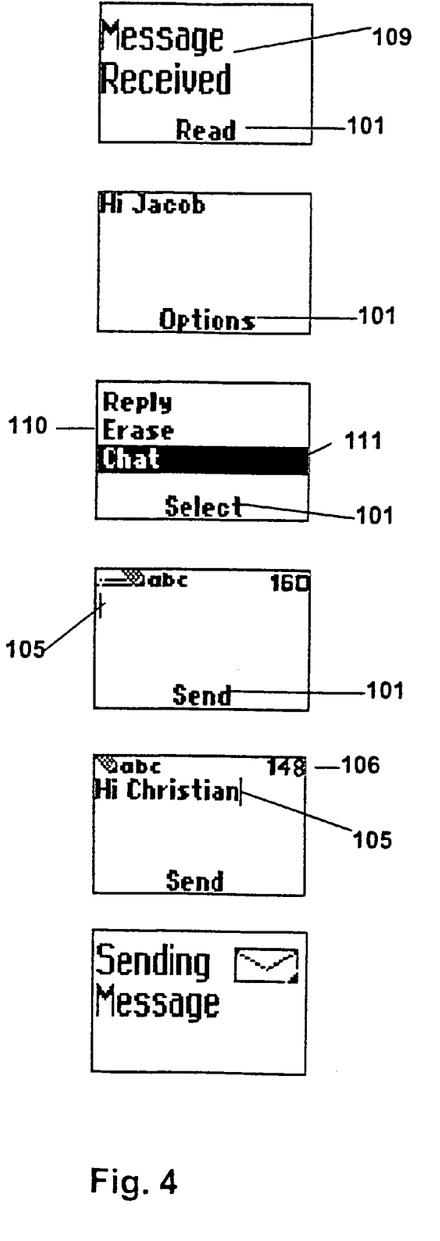
FIG. 4 shows a display sequence illustrating the message response in the chat session according to the preferred embodiment of the invention.

FIG. 4 refers to the situation where a reply has been received from the other chatter, and this message will be received as a standard SMS. This is illustrated in the first display in FIG. 4. If the user wants to read the received message he presses the soft key 8 having the present functionality "read" as shown by the text label 101. The message "Hi Jacob" is displayed in the second display and the soft key 8 now has the functionality "options" as shown by the text label 101.

When the user selects the "options" functionality a list 110 of options appears on the display as shown in the third display with one of the options 111 ("chat") highlighted (or reversed in colours). The "reply" and the "erase" functionalities are standard short message operations, and if one of these is selected the message will be handled as such. However if the user selects "chat" the text entry display shown as the fourth display will appear.

User enters text entry display or the chat editor and can send directly (several times) to the sender of the original message. When responding to the original message, the message text for replying to the received message may be input by the user as an arbitrary string of message text having a variable length. The message text for replying to the received message may be a random message text that is not dependent on the received message. The text entry display will look like the "normal" SMS editor for a GSM phone and will include the marking bar 105 indicating the position of the character to be entered, and the digit 106 that indicates the maximum number of characters that can still be entered into the message.

By selecting "Send" the phone will immediately send the written text 107 to the number specified for chatting and this will be indicated by an animation 108 shown in the sixth display. If the user presses the scroll key 10 he will get access to the alternative options available in the soft key 8. These options may include e.g. "T9 options", "Save" and "Insert template". The phone will now re-enter the text editor as shown in the seventh display of FIG. 3.

Figure 5:
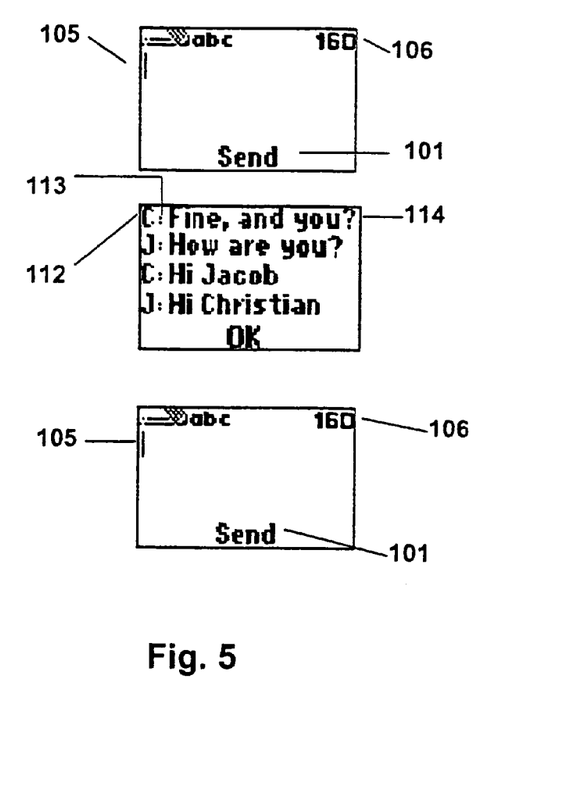
FIG. 5 shows a display sequence illustrating a later stage in the chat session according to the preferred embodiment of the invention.

FIG. 5 shows how the user can easily receive chat messages in idle mode as well as in the chatting editor, as shown in the first display. When a message in an ongoing chat session is received, the processor 18 allows this message from the other person to directly pop-up in the editor.

Therefore the received message will be displayed immediately to the user—even if the user is in the middle of writing. As seen in the second display of the chat display displays simultaneously several (here four) individual chat messages. Each of these messages starts with a short chat name 112 identifying the person who sent the message. The chat name 112 was explained in FIG. 3 and according to the present invention Christian uses the chatname "C" and Jacob the chat name "J". The chat name112 is followed by a by a simicolon as spacing sign 113 and then the message text 114.

The text message may be divided into several lines and according to the preferred embodiment the text message is terminated with a line break. The newest input is automatically put on top of the older input when displayed. When pressing the "OK" soft key 8 the phone will bring the user back to the chat editor (as shown in the third display of FIG. 5) to e.g. reply immediately.

When the user has entered the text to be sent, the processor 18 when sending automatically simply adding the "old" text after the new text to be sent. Hereby the full chat history is included in the displayed text.

According to the preferred embodiment only messages received from a chatter will be displayed this way. Chat messages will not be stored on the SIM card as normal messages do. When the user writes a second text or a response, and selects the "Send" option for the soft key, the phone will now do as follows:

Take the last received chat message and add the new text entered by the user to the beginning of the message—always on a new line.

Maximum one SMS is used. When the message is "full" (a SMS may contain 160 charcters as a default standard), the text is removed line wise from the end of the message.

Since all chat messages are sent as standard SMS (including the initial chat message), the person receiving an initial chat message will receive it as a standard SMS message. The reception of a message is shown as the first display of FIG. 4.

The embodiment explained above may be implemented as a new software application handling the messages. It is the user who determines who to invite to participate in the chat session. This is basically explained below with reference to FIG. 6.

Figure 6:
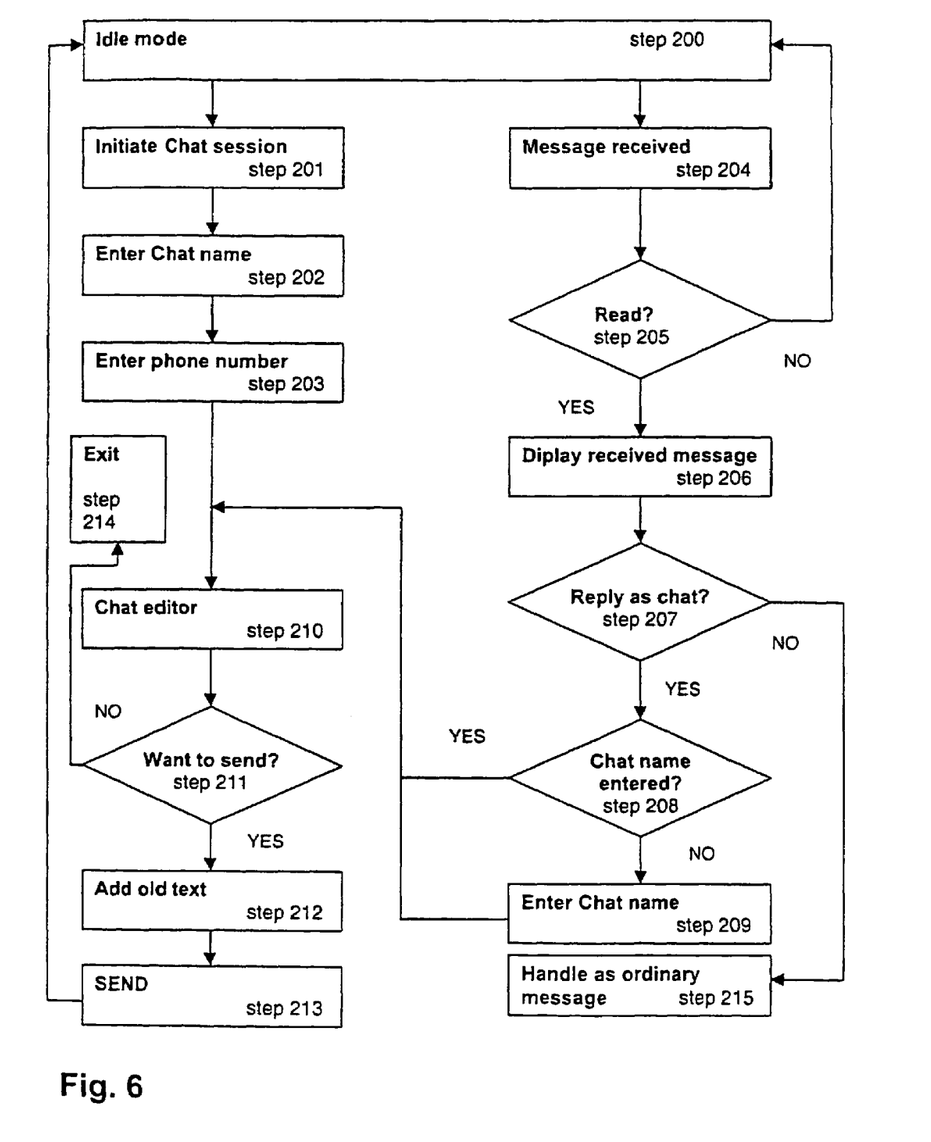
FIG. 6 shows a flow chart illustrating the steps of the message handling application according to the preferred embodiment of the invention.

From idle mode (step 200) the user initiates the chat session by selecting chat from the menu (step 201). Then the user is requested to input a chat name (step 202) if a chat name is not stored as a default name. The user is then requested to input a chat number (step 203), and when this is done the user enters the chat editor (step 210). When the user wants to exit the chat editor, but does not want to the send the message he exits at step 214, where he e.g. may save the written text for later use or simply wants to quit without saving.

If he at step 211 indicates that he wants to-send the chat message the chat history or at least a part of it is added at step 212, and the message is sent at step 213. Hereafter the phone goes back to idle mode at step 200.

In idle mode (step 200) when a message is received in step 204 and the user is offered the option to read the message in step 205. If the user does not want to read the message the phone goes back to idle mode (step 200), otherwise the received message is displayed at step 206, and the user is asked whether he wants to reply the message as chat in step 207. If he does not want to reply to the message the chat the message is handled as an ordinary message at step 215. If he does want to reply to the message as the chat the message it is checked at step 208 whether a chat name has been entered. If not the chat name may be entered at 209 and the phone enters the chat editor at step 210.

Chat Based on a Chat Server.

According to this embodiment the user is still allowed to easily swap between message writing and message viewing. The user sets up a phone number to a chat server 40 in the Short Message Service Center 44 as indicated in FIG. 5. The chat service is provided by the network, and may include a server containing chat rooms etc. When the user uses the chat room phone number the server 40 allows the requesting terminal to access an ongoing chat handled by the server. The chatting does not necessarily have to based on the use of SMS messages but could also include E-mail being converted to SMS messages at the chat server and forwarded to the chat participants as an ordinary chat message. Hereby the chat participants may be identified by phone number or E-mail address or the like.

Figure 7:
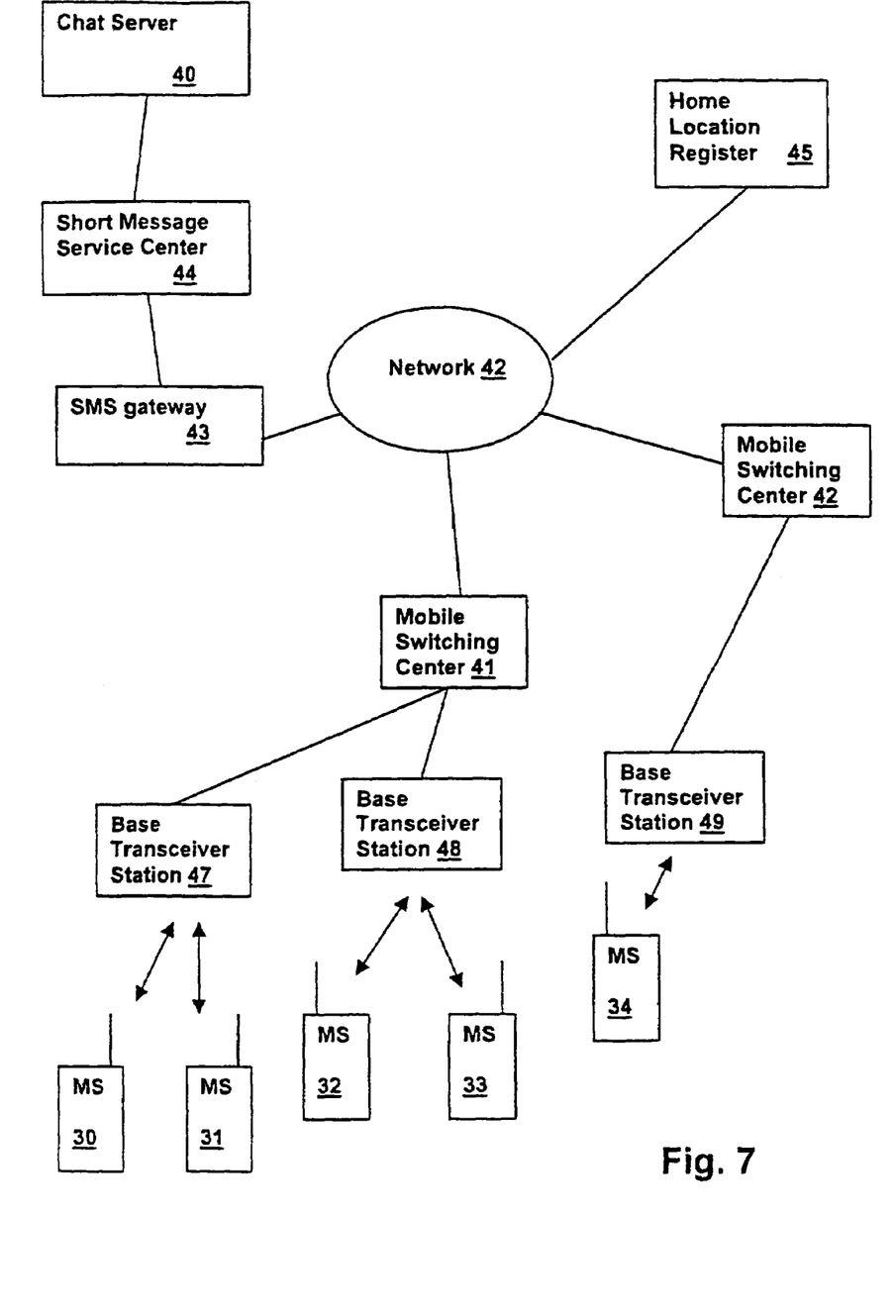
FIG. 7 shows an example of the interaction between the mobile terminals and a chat server in a chat session based on a chat server in a network according to a second embodiment of the invention.

A preferred embodiment of the system architecture for managing the credit system is shown in FIG. 7. A Home Location Register 45 (HLR) contains a database including relevant subscriber information for the provision of the telecommunication service. A CCITT specified network 42 interconnects the individual parts of the system. An SMS gateway & SMS interworking Mobile Switching Center (MSC) 43 is a switching unit routing a message or a call to a Mobile Station 30-34 (the phone 1). A Short Message Service Center 44 (SMSC) and the SMS gateway & SMS interworking Mobile Switching Center (MSC) 43 handles and routes the SMS's between the Short Message Service Center 44 and the Network 42. From the Network 42 the messages are routed to the Mobile Station 30-34 via a Mobile Switching Center (MSC) 41-42. Base Transceiver Station (BTS) 47-49 establish the air connection to the Mobile Stations 30-34.

According to a second embodiment of the invention a network operator or other third party company handling a chat server 40 could offer a chat function between persons not knowing each other. For example a network operator may have a chat server 40 supporting a feature where the user may send a chat request from his mobile station 30-34 to the server 40 by means of a short message using a special phone number. This server 40 automatically places people sending a similar request message to the server 40 into "chat groups" or "chat rooms". Whenever a user being part of such a group 30-34, sends a message to the server 40, the server 40 adds the text from the message on top of the previous communication in the chat group and forwards the up-dated communication in a message to all the other persons in the group 30-34. The chat server 40 is responsible for the distribution of the text messages and the distribution lists.

When using gateways in the network the user will be allowed to specify an E-mail address for the chat server, and not just a phone number. The user should furthermore be allowed to specify two phone numbers/E-mail addresses; one to which chat message is sent and one from which the server messages are received.

Chat Based on Distribution Lists.

According to a third embodiment of the invention the initiating user first has to select a distribution list to chat with. The initiating user will according to the present charging concept have to pay for a substatial part of the messages, because all messages will go though him. However there will be a market for this concept because X may be regarded as a "conference chat" similar to a conference call having multiple participants invited by an initiating user.

Figure 8:
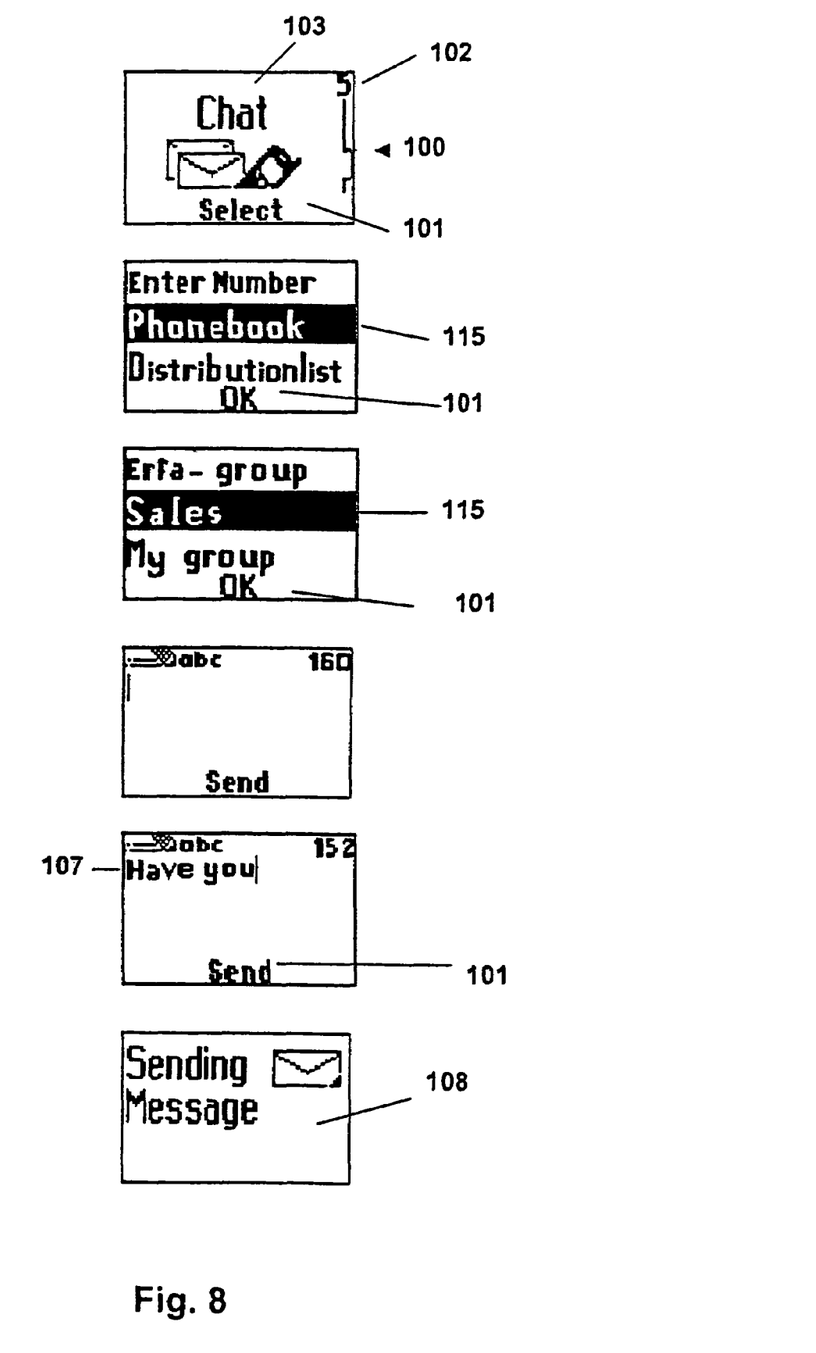
FIG. 8 shows a display sequence illustrating a chat session based on distribution lists according to a third embodiment of the invention.

This third embodiment will be illustrated with reference to FIG. 8. In the first display 100 (similar to the first display of FIG. 3) is a chat entry display in the main menu of the phone, and as in the first embodiment this display includes a text label 101 defining the present functionality of the soft key 8, a menu status bar 102 and an animating icon 103.

By selecting "chat" the phone allows the user to define what number to chat with. By selecting "Enter Number" or "Phonebook" in the second display the user is allowed to target a phone number for his chatting request—either point-to-point chatting with another phone user as explained with reference to the first embodiment or a chat server based multi user chat session as explained with reference to the second embodiment. The third embodiment does allow the user to initiate a conference chat session where the participants are invited by the initiating user. The user has to move the hight lighting cursor 115 to the "Distribution list" by using the scroll key 10 and selecting the operation by pressing the selection key 8.

In the third embodiment the " Chat menu" has the sub menus "Enter number" for manually inputting the chat phone number, "Phonebook" for picking the chat phone number up from the phonebook (this is the same way as getting a phone number from the phonebook for an SMS message), and "Distribution list". The "Distribution list" submenus inlcudes:

1. "Existing lists"—each including a number of already appointed participants for conference chat. These lists have names the which the user may scroll when he has selected the item;
2. "Add new list"—by means of which the user may name the distribution list, appoint members for a distribution list and add the distribution list to the "Existing lists" list; and
3. "Edit list"—here the user is allowed to select a distribution list from "Existing lists" and edit the distribution list name and add/delete/rename one or more of the appointed members of the distribution list.

If the user selects "Distribution list" in the second display he is allowed to invite users included in user-defined distribution lists "Erfa-group", "Sales" and "My group" to participate in a conference chat. When the user has selected one distribution list in the third display, e.g. the highlighted one 115, he may enter a message as indicated in the fourth and fifth display of FIG. 8.

When the initiating user 300 (see FIG. 9) finalizes the message and presses the "Send" softkey 8 the phone starts successively sending this first message to each of the conference chat participants 310 listed on the selected distribution list (this includes N individuals 311-313). When one of the other conference chat participants 312 replies (second input 315) to this first message, the reply includes the reply message on top of the original message, and the reply message is transmitted to the initiating user alone. The initiating user retransmits 316 the reply message to all the conference chat participants listed on the selected distribution list—advantageously to all except the replying one.

Figure 9:
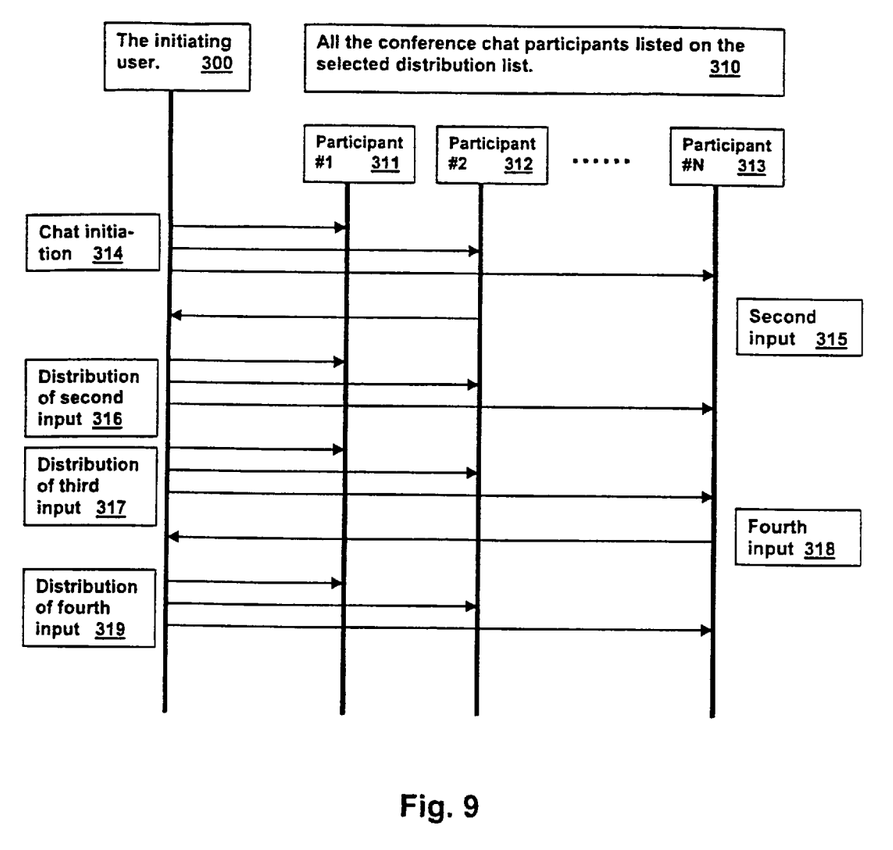
FIG. 9 illustrates the message handling according to a third embodiment of the invention.

The initiating user may of course add his comments prior to the re-transmission. The initiating user may select whether his phone automatically re-transmits this reply message or whether he should accept the re-transmission. The phone of the initiating user acts as chat server and the other parties will see this chat as a point-to-point chat with the initiating user, however they will see the texts (and chat names) of the entire conversation.

However if the phone retransmits the reply automatically the phone will have to distribute a third input 317 if the initiating user wants to make comments to the reply. Later on the N'th participant 313 makes an input 318 and this input is transmitted to the initiating user 300 who automatically re-transmits this input to all the conference chat participants listed on the selected distribution list—advantageously to all except from the replying one.

Three Party Chat Concept

In order to reduce the cost for the master (the initiating phone) of a e.g. three-point chat session, and if all the involved parties have a phone capable of doing a three-point chat, a setting to switch off the auto-forwarding of received short messages during the chatting could be offered.

This would make sense for e.g. "broadcasting" messages, then they can start by exchanging their phone numbers, and afterwards they can all enter three-point chatting (with the auto-forward switched off), and hereby each of the involved parties will send to both of the other chatters whenever they send a message; this will reduce the total amount of sent messages, and distribute the costs more evenly (the user will only have to pay for outgoing messages).

The suggested three-person chat in this document is actually not limited to three-person chatting. If several of the persons in the three-person chat have phones supporting three-party chat, one (or both) of the other chatters may also initiate three-person chat (and hence include a fourth, fifth etc person to the chatting). All users will—due to the auto-forwarding—receive all chat messages sent by all chatters.

Chat Based on Distributed Distribution Lists.

The third embodiment is based on the existing GSM specification that does not allow use of distribution lists for SMS message sending. However if the specification in the future allows use of distribution lists for SMS messages the initial message could as a fourth embodiment contain all phone numbers of the conference chat participants listed on the selected distribution list, and these numbers are then sent to all chatters—the other chatters can then use the numbers inside the message to reply to the chat message. All participants will then send messages using this "distribution list".

Chat Useability Improvements

A further embodiment of the invention includes a further improvement of the invention. The chat application will here has a history display in addition to the chat editor window. When entering the chat menu the user has to select between a new chat session (and the editor where the user may enter targets for the chat session, chat name and text occurs), or chat histories (where the user may select between the histories stored in the phone and identifyed by a label automatically generated based on the name of the originator of chat session and/or the time. This label may be renamable. When the user views the chat history (older messages send in the chat session), pressing the clear-key will bring the user back to the chat editor where he can enter new text. A further press of the clear-key will cause the phone to jump out of the chat application. The user may according to this embodiment be offered an option to save the chat history as a text string so the text string may be used in another application, and e.g. forward it to a third person.

This concept is based on offering the user an additional option in the SMS based chat editor, called "Save History". This option is according to the described embodiment available only from the chat editor and not from the history viewing (since here we only have "OK" on the soft-key—for simplicity). The "Save History" option will simply save the history as a concatenated message in the normal SMS Outbox.

If the history is longer than supported, the history is truncated from the end (oldest) before saved. When the "Save History" function is selected, the user will get a confirmation note showing that the "history is stored" or that the "history is stored to the Outbox" (so that user can find it afterwards). After a timeout, the phone returns to the Chat editor.

If the user—in the same chat session—chooses to save the history, there will be stored several messages in the Outbox (no overwriting). If the Outbox memory is full, user will get an error note, and the saving is discarded.

What is claimed is:

1. A method for handling a message exchange session between wireless communication terminals via a wireless network comprising:
    initiating a message exchange session by:
        identifying in a first communication terminal at least one other communication terminal to be invited to participate in the message exchange session;
        inputting a message text;
        transmitting said message text to said at least one other communication terminal; and
    responding to a received message by:
        inputting a message text for replying to the received message;
        adding said inputted reply message text to the received message text, the inputted reply message text being automatically and successively added above a previous message text prior to transmission of a response to the received message, whereby the response comprises an aggregate message text that includes the message exchange session history, where the previous message text is removed linewise from an end of the message when the message exceeds a maximum number of allowable characters; and
        transmitting said aggregate message text to the other communication terminal being party to the message exchange session.

2. A method according to claim 1, wherein a point-to point short message service in the wireless network is used as message exchange session.

3. The method of claim 1 further comprising when responding to a received message, inputting the message text for replying to the received message as an arbitrary string of message text, inputted by a replying user.

4. The method of claim 1 wherein the message exchange session comprises an arbitrary exchange of messages between at least the first communication terminal and the at least one other communication terminal invited to participate in the message exchange session.

5. The method of claim 1 wherein the message text for replying to the received message is a random message text and is not dependent on the received message.

6. The method of claim 1 wherein the at least other communication terminal to be invited to participate can view the message exchange history prior to inputting a message that is independent of the message exchange session history.

7. The method of claim 1 wherein the message exchange session is a free-flowing exchange of messages, wherein one message is not necessarily dependent on another message.

8. The method of claim 1 wherein any one of the wireless communication terminals can initiate a message exchange session and generate a message requesting a response.

9. The method of claim 1 further comprising inputting a second message text and transmitting said second message text prior to receiving a reply to a first message text.

10. The method of claim 9 wherein the at least one other communication terminal receives and displays the second message text while a message text is being inputted for replying to the first message.

11. The method of claim 1 further comprising in the first communication terminal, receiving the message text for replying to the received message and adding the received message text as a new line to a beginning of a last received message.

12. The method of claim 1 wherein inputting a message text for replying to the received message comprises input a variable length message string as the reply message.

13. The method of claim 1 further comprising successively adding received message text from each of the at least one other communication terminal to the message text for replying to the received message in order to update the message text wherein the aggregate message text is transmitted to each of the at least one other communication terminal.

14. A wireless communication terminal having a message exchange session handling application for handling messages in a message exchange session in a wireless communication system, wherein said terminal comprises:
  a software application having means for initiating a message exchange session, wherein said initiating means includes:
    means for identifying at least one other communication terminal to be invited to participate in the message exchange session;
    means for entering a text input as a message text;
  a transmitter for transmitting said message text to said at least one other communication terminal;
  a receiver for receiving a reply from said at least one other communication terminal;
  said software application furthermore having means for replying to a message during a message exchange session, wherein said replying means includes:
    means for entering a text input string as a reply to a received message text; and
    means for automatically and successively adding said text input string to the received message text prior to a transmission of the reply, for generating an aggregate message text for replying by means of the transmitter to the other communication terminal, where the aggregate message text is removed linewise from an end of the message when the message exceeds a maximum number of allowable characters.

15. A wireless communication terminal according to claim 14, wherein the transmitter transmits the message text by means of a point-to point short message service in the wireless network.

16. The wireless communication terminal of claim 14 wherein each communication terminal is a mobile telephone.

17. A wireless communication terminal having a message exchange session handling application for handling messages in a message exchange session in a wireless communication system, said terminal comprises:
  a software application having means for replying to a received message during a message exchange session, wherein said replying means includes:
    means for entering a text input string as a reply to the received message; and
    means for automatically adding said text input string successively to the received message text for generating an aggregate message text for replying to the message, prior to a transmission of the reply, where the aggregate message text is removed linewise from an end of the message when the message exceeds a maximum number of allowable characters.

18. A computer program product stored on a computer readable storage medium, comprising:
  computer readable program code means for causing a computer to reply to a message during a message exchange session in a wireless communication system, said computer readable program code means causing a computer to provide a message exchange session handling application in a wireless communication terminal;
  computer readable program code means causing a computer to handle a text input string entered by a user as a reply to a received message; and
  computer readable program code means for causing a computer to automatically and successively add said text input string above the received message text for generating an aggregate message text for replying prior to transmission of the reply, where the aggregate message text is removed linewise from an end of the message when the message exceeds a maximum number of allowable characters.

19. A method for handling a message exchange session between wireless communication terminals via a wireless network comprising:
  sending from a wireless communication terminal by means of a point-to point short message service in the wireless network a message containing a request for participating in a message exchange session;
  routing the request message from the wireless communication terminal to a message exchange session handling server via the wireless network;
  connecting in the message exchange session handling server the requesting wireless communication terminal to a group of communication terminals;
  handling a message text in said message exchange session handling server by successively adding received message text from each of the group of communication terminals to the message text in order to update the message text;
  adding further message text to the received message text from each of the group of communication terminals; and
  transmitting the updated message text to each of the group of communication terminals participating in the message exchange session.

20. A method for handling a message exchange session between wireless communication terminals comprising:
  generating a list of communication terminals to be invited to participate in the message exchange session;
  inputting a message text;
  transmitting said message text to the communication terminals listed on said list;

receiving a reply from one of the communication terminals listed on said list;

automatically and successively adding the received reply above a previous message text prior to retransmission of the reply from one of the communication terminals to the communication terminals listed on the list, where the previous message text is removed linewise from an end of the message when the message exceeds a maximum number of allowable characters; and transmitting the reply from said one of the communication terminals to the communication terminals listed on said list.

21. A method according to claim 20 wherein said message text is successively transmitted to each of said communication terminals listed on said list.

22. A method according to claim 20 wherein said reply is successively retransmitted to each of said communication terminals listed on said list apart from the replying one.

23. A wireless communication terminal having a message exchange session handling application for handling messages in a message exchange session in a wireless communication system, wherein said terminal comprises:

means for generating a list of communication terminals to be invited to participate in the message exchange session;

means for inputting a message text;

means for transmitting said message text to each of the communication terminals listed on said list;

means for receiving a reply from one of the communication terminals listed on said list;

means for automatically adding the received reply above a previous message text prior to retransmission of the reply from one of the communication terminals to the communication terminals listed on the list, where the previous message text is removed linewise from an end of the message when the message exceeds a maximum number of allowable characters; and means for transmitting the reply from one of the communication terminals to each of the communication terminals listed on said list.

24. A wireless communication terminal according to claim 23 wherein the transmission means successively transmits said message text to each of said communication terminals listed on said list.

25. A wireless communication terminal according to claim 23 wherein the transmission means successively re-transmits said reply to each of said communication terminals listed on said list apart from the replying one.

26. A wireless communication terminal according to claim 23 wherein the terminal includes means for adding the reply message text above the previous message text prior to the re-transmission of the reply from said one of the communication terminals to the communication terminals listed on said list.

27. A method, comprising:

initiating a message exchange session by:

identifying in a first communication device at least one other communication device to be invited to participate in the message exchange session;

inputting a message text;

transmitting said message text to said at least one other communication device; and responding to a received message by:

inputting a message text for replying to the received message;

adding said inputted reply message text to the received message text, the inputted reply message text being automatically and successively added above a previous message text prior to transmission of a response to the received message, where the response comprises an aggregate message text that includes a message exchange session history, where previous message text is removed line wise from an end of the message when the message exceeds a maximum number of allowable characters; and transmitting said aggregate message text for reception by the at least one other communication device.

28. The method of claim 27, where a wireless network point-to-point short message service is used during the message exchange session.

29. The method of claim 27 further comprising, when responding to a received message, inputting message text for replying to the received message as an arbitrary string of message text, inputted by a replying user.

30. The method of claim 27, where the message exchange session comprises an arbitrary exchange of messages between at least the first communication device and the at least one other communication device invited to participate in the message exchange session.

31. The method of claim 27, where the message text for replying to the received message comprises random message text not dependent on the received message.

32. The method of claim 27, where the at least other communication device is configured to view the message exchange history prior to inputting a message that is independent of the message exchange session history.

33. The method of claim 27, where the message exchange session is a free-flowing exchange of messages where one message is not necessarily dependent on another message.

34. The method of claim 27, where any one of a plurality of communication devices can initiate a message exchange session and generate a message requesting a response.

35. The method of claim 27, further comprising inputting a second message text and transmitting said second message text prior to receiving a reply to a first message text.

36. The method of claim 35, where the at least one other communication device is configured to receive and display the second message text while a message text is being inputted for replying to the first message.

37. The method of claim 27, further comprising in the first communication device, receiving the message text for replying to the received message and adding the received message text as a new line to a beginning of a last received message.

38. The method of claim 27, where inputting a message text for replying to the received message comprises inputting a variable length message string as the reply message.

39. The method of claim 27, further comprising successively adding received message text from the at least one other communication device to the message text for replying to the received message in order to update the message text, where the aggregate message text is transmitted to the at least one other communication device.

40. An apparatus, comprising:

a user interface comprising an input device and a display device;

a transmitter;

a receiver; and a data processor configured to respond to the user interface to initiate a message exchange session by identifying at least one other communication device to be invited to participate in the message exchange session; the data processor further configured to respond to text entered through said input device to transmit the entered text with the transmitter for reception by the at least one other communication device; said data processor further configured to respond to reception of message text from the at least one other communication device during the message exchange session to automatically and successively add text entered through said input device to received message text to form an aggregate message text to be transmitted to the at least one other communication device, said data processor being further configured to respond to a condition where an amount of the text of said aggregate message text exceeds a maximum number of characters to remove text line wise from an end of the aggregate message text.

41. The apparatus of claim 40, where the transmitter and receiver are configured for use in a wireless communication system.

42. The apparatus of claim 40, where the transmitter and receiver are configured for use in a cellular communication system.

43. The apparatus of claim 40, where the transmitter and receiver are configured for use in a GSM cellular communication system, and where the message exchange session is conducted using a short message service feature of the GSM cellular communication system.

44. An apparatus, comprising:
a user interface comprising an input device and a display device;
a transmitter;
a receiver; and
a data processor configured to respond to reception of message text from at least one other communication device during a message exchange session to automatically and successively add text entered through said input device to received message text to form an aggregate message text to be transmitted to the at least one other communication device, said data processor being further configured to respond to a condition where an amount of text of said aggregate message text exceeds a maximum number of characters to remove text line wise from the end of the aggregate message text.

45. The apparatus of claim 44, where said data processor is further configured to respond to the user interface to initiate the message exchange session by identifying at least one other communication device to be invited to participate in the message exchange session; the data processor further configured to respond to text entered through said input device to transmit the entered text with the transmitter for reception by the at least one other communication device.

46. The apparatus of claim 45, where said data processor is further configured to respond to the user interface to initiate the message exchange session by identifying a plurality of other communication devices to be invited to participate in the message exchange session, and where the message text is successively transmitted to each of the plurality of other communication devices.

47. The apparatus of claim 44, where the transmitter and receiver are configured for use in a wireless communication system.

48. The apparatus of claim 44, where the transmitter and receiver are configured for use in a cellular communication system.

49. The apparatus of claim 44, where the transmitter and receiver are configured for use in a GSM cellular communication system, and where the message exchange session is conducted using a short message service feature of the GSM cellular communication system.

50. A data storage medium readable by a data processor of a communication device, said storage medium containing program instructions the execution of which by the data processor result in operations that comprise:
initiating a message exchange session by:
identifying at least one other communication device to be invited to participate in the message exchange session;
inputting a message text;
transmitting said message text to said at least one other communication device; and
responding to a received message by:
inputting a message text for replying to the received message;
adding said inputted reply message text to the received message text, the inputted reply message text being automatically and successively added above a previous message text prior to transmission of a response to the received message, where the response comprises an aggregate message text where previous message text is removed line wise from an end of the message when the message exceeds a maximum number of allowable characters; and
transmitting said aggregate message text for reception by the at least one other communication device.

51. The data storage medium of claim 50, where the program instructions are configured to use a wireless network point-to-point short message service during the message exchange session.

52. The data storage medium of claim 50, embodied in a wireless communication device configured for use in a cellular communication system.

53. The data storage medium of claim 50, embodied in a wireless communication device configured for use in a GSM cellular communication system, where the program instructions are configured to use a short message service feature of the GSM cellular communication system during the message exchange session.

* * * * *